United States Patent Office 3,540,188
Patented Nov. 17, 1970

3,540,188
METHOD AND APPARATUS FOR CONTROLLING CYCLIC SORPTIVE PROCESSES
Clem A. Barrere, Jr., Ponca City, Okla., and John Lohrenz, Calgary, Alberta, Canada, assignors to Continental Oil Company, Ponca City, Okla., a corporation of Delaware
Filed June 26, 1968, Ser. No. 740,109
Int. Cl. B01d 53/30
U.S. Cl. 55—20        6 Claims

ABSTRACT OF THE DISCLOSURE

Method and apparatus are disclosed for synchronizing the heating, cooling and saturation periods for sorbent beds in a cyclic gas process for extracting condensables from a gas stream subject to variation in flow volume and condensable content. A control device containing a memory section switches the sorbent beds from one cycle to the next and adjusts flow streams in the cooling and heating circuits to coincide with the saturation time of the sorbent bed in the sorption circuit. The system includes at least one gas-composition analyzer.

FIELD OF INVENTION

Figure 1:
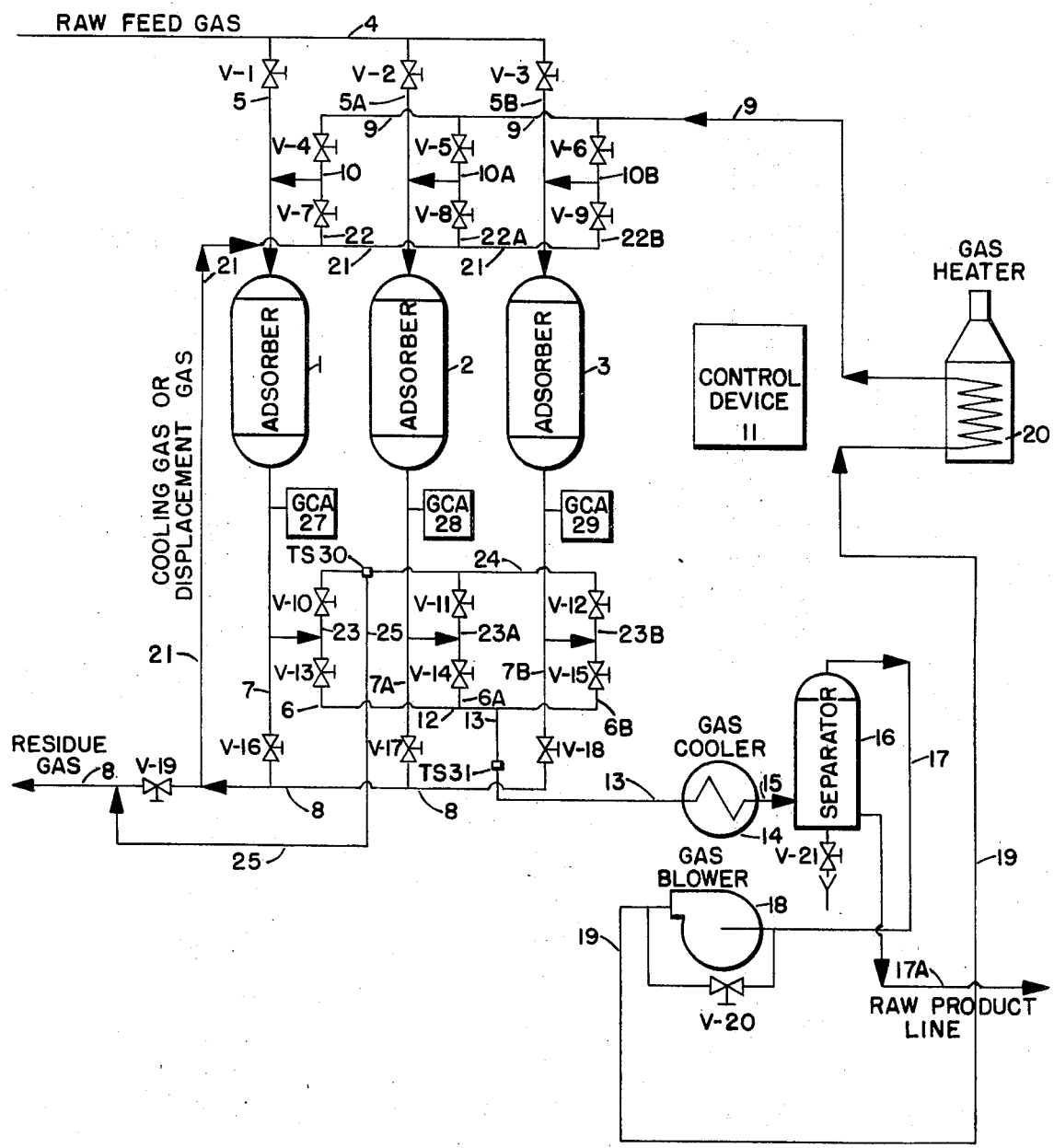

This invention relates to new and useful improvements in processes and apparatus for recovering hydrocarbons from gas streams. More specifically, it is concerned with method and apparatus for maintaining the sequence of cycling a series of sorbent beds through the various phases of a gas sorption process at greatest efficiency.

DESCRIPTION OF PRIOR ART

The recovery of hydrocarbon components from a gas stream by flowing the stream through a bed of sorbent material is widely known and practiced. Usually a system of several sorbent beds (or adsorbers) is utilized in a cyclic sequence. Each bed in turn is exposed to the flowing stream of feed gas in a sorption circuit and, when saturated with sorbate, is regenerated. The bed is usually regenerated in a heating circuit by flowing through it a stream of heated gas which vaporizes the sorbate into the flowing stream. The flow stream is then cooled; vaporized sorbate is condensed to a liquid and removed in a separator. The gas stream from the separator can be reheated and recirculated to the bed being heated, vented from the system, returned to the raw feed gas flowing to the system, or treated in other ways. After the sorbent bed has been heated it can be cooled in a cooling circuit by flowing through it a lean cool gas, such as raw feed gas, or residue gas from the sorbent bed in the gas processing or adsorption phase of the system. Often, prior to the cooling operation, the rich heating gas in the heated bed is displaced to another bed and retained within the system in a purge or displacement step.

In a system wherein several sorbent beds cycle through sorption, heating or regenerating, and cooling steps, it obviously is desirable when a cycle is completed that beds reach their individually desired conditions of cooling, heating, or saturation simultaneously so that the process can continue cycling smoothly and efficiently. If the raw feed gas stream to the system is subject to variations in flow volume and sorbable content, the system must be sufficiently adaptable to compensate for these fluctuations.

Although systems for treating gases by sorption processes can be designed for such fluctuations, such designs necessitate over-sizing the sorbent beds and associated equipment. This, in return, requires increased capital expenditures and increased heating and cooling costs for the excess of bed size, even when this excess is not being actively utilized.

An object of this invention, therefore, is to improve the efficiency of adsorption processes which utilize a plurality of sorbent beds in a cyclic sequence.

Another object of this invention is to make possible the use of smaller sorbent beds in gas sorption processes.

Another object is to decrease the amount of heating and cooling required in a gas sorption process.

Another object of the invention is to synchronize, in a multi-bed sorption process, the time required to complete heating and cooling of saturated and heated sorbent beds respectively with the time required to saturate at least one other sorbent bed in a sorption circuit.

SUMMARY OF THE INVENTION

Briefly stated, our invention comprises method and apparatus utilizing a plurality of sorbent beds for removing condensables from a gas stream in which:

(a) a gas composition-analyzer is placed in the flow stream from the sorbent bed in the sorption circuit, and
(b) a temperature sensing device is placed in the flow stream from the sorbent bed in the heating circuit.

The gas composition-analyzer and the temperature sensing device are coupled electrically, or by other means, to a control device. The control device is also connected to valves controlling gas flow in the sorbent beds and contains a memory section. When the gas composition-analyzer indicates a change in composition of the flow stream (breakthrough of a key component) from the adsorber bed in the sorption circuit and this change is signaled to the control device, and when the completion of heating of the bed in the heating circuit is indicated by a signal from the temperature sensor, the control device automatically changes the process flow streams to begin the next process cycle. Prior to beginning the next cycle, an intervening step may be incorporated, wherein, the order to conserve rich vapors in the system, rich gas in the heating circuit is displaced into the bed in the sorption circuit. The memory section in the control device records the time interval required to heat the bed in the heating circuit, compares it with the time required to achieve breakthrough of a key component in the adsorber in the sorption circuit, and adjusts the temperature and flow rate of the gas flowing in the heating circuit to make the two time intervals equal in the next cycle. Preferably, a second temperature sensor also is mounted in the flow stream from a third bed in the cooling circuit. Completion of cooling of this third bed in the cooling circuit is also signaled to the control device, and the flow of cooling gas in the cooling circuit is adjusted from one cycle to the next to make this time interval equal to the other two time intervals. The time for heating and cooling of these beds in the heating and cooling circuits is thereby synchronized with the time required to saturate the adsorbed bed in the sorption circuit.

Figure 2:
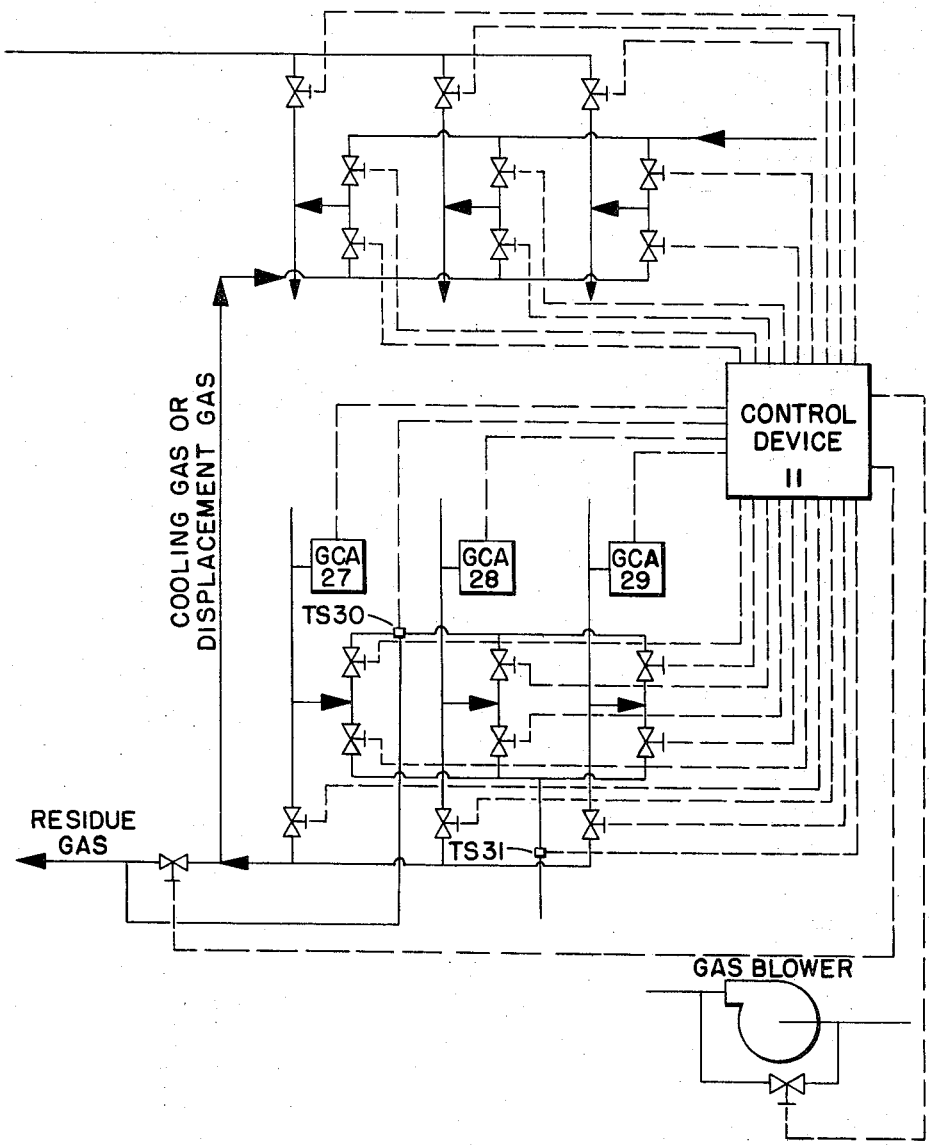

FIGS. 1 and 2 depict one embodiment of the method and apparatus of the invention although it is to be understood the invention is equally adaptable to other gas sorption processes. This embodiment has been chosen for illustrative purposes and utilizes a relatively simple flow scheme.

FIG. 1 depicts the flow system of gas streams through a three-bed adsorber system. FIG. 2 depicts a pneumatic or electric system whereby the control device 11 opens and closes the valves in the system. The invention is depicted in two figures to enhance clarity of the description. FIG. 2 may be regarded as superimposed upon FIG. 1 for a complete understanding of the invention.

In general, FIG. 1 depicts a three-bed sorption system for removing condensables from a gas wherein: one adsorber bed is continually exposed to a stream of raw feed gas and adsorbs condensables from the stream; a second adsorber bed is in a closed heating or regeneration circuit; and a third adsorber bed is in an open cooling circuit. Each abbreviation, GCA, indicates a gas composition-analyzer, described in more detail subsequently. Each abbreviation, TS, indicates a temperature sensor. The valves in the system have been designated as V–1, V–2, V–3, etc., and are opened and closed by the control device 11 for the flow described in each conduit. The valves are electrically or pneumatically controlled by control device 11. The electric or pneumatic control lines are shown in FIG. 2 as broken lines connecting the control device 11 to the various valves. Adsorbers 1, 2 and 3 are sorbent beds filled with a conventional sorbent material, such as activated carbon, which will adsorb hydrocarbon condensables present in a stream of hydrocarbon gas flowing therethrough. Let it be assumed that adsorber 1 is in the sorption phase in the sorption circuit, adsorber 3 is in the heating or regeneration phase in the heating circuit, and the adsorber 2 is in the cooling phase in the cooling circuit.

The sorption circuit, assuming adsorber 1 is in the sorption phase, consists of feed gas conduit 4, valved conduit 5, adsorber 1, valved conduit 7, and residue gas line 8. Raw feed gas flows through conduits 4 and 5, and into adsorber 1 where condensables are adsorbed. The stripped, residue gas exits through conduits 7 and 8. In other cycles valved conduits 5A and 7A and conduits 5B and 7B will serve the function of conduits 5 and 7 when adsorber 2 or adsorber 3, respectively, is in sorption service.

The heating circuit, assuming adsorber 3 is being heated to remove adsorbed condensables from it, consists of conduit 9, valved conduit 10B, a portion of conduit 5B, adsorber 3, a portion of conduit 7B, valved conduit 6B, conduits 12 and 13, cooler 14, conduit 15, separator 16, conduit 17, gas blower 18, conduit 19, and heater 20. Conduit 17A permits the withdrawal of liquid accumulated in separator 16. Gas flowing through the closed circuit described is heated in heater 20 and flows through conduits 9, 10B and part of 5B to adsorber 3 wherein the condensables adsorbed are vaporized. The gas with vaporized condensables flows from adsorber 3 through part of conduit 7B, conduits 6B, 12, 13, cooler 14, conduit 15, and separator 16 where the condensables are collected; residue gas from the separator flows through conduit 17, blower 18, conduit 19, and returns to heater 20. In other cycles conduits 10 and 6 and conduits 10A and 6A will serve corresponding functions to conduits 10B and 6B when adsorber 1 and adsorber 2, respectively, are in the heating phase in the heating circuit.

The cooling circuit, assuming adsorber 2 is in the cooling phase, consists of cooling gas inlet conduit 21, valved conduit 22A, part of conduit 5A, adsorber 2, part of conduit 7A, valved conduit 23A and conduits 24 and 25. In this cooling circuit, a part of the residue gas in conduit 8 from the adsorber bed in the sorption circuit is directed through conduit 21, conduit 22A, part of conduit 5A, and adsorber 2. Exit cooling gas flows from adsorber 2 through conduit 23A, 24, and 25 to the residue gas line 8.

Gas compositional analyzers 27, 28, and 29 are mounted intermediate of or in communication with conduits 7, 7A and 7B, respectively, leading from each of the adsorbers 1, 2, and 3. Alternatively only one gas-composition analyzer is required if it is located to analyze gas flowing in conduit 8 at a point upstream of the union of conduit 8 with conduit 21. Such gas-composition analyzers are well known in the art and can be, for example, the thermal conductivity type (katharometer), in which a change in composition of a gas flowing over a heated wire effects a change in the measured conductivity of the wire. Temperature sensor 30, which can be a simple thermocouple, is mounted in the cooling gas effluent conduit 25 and temperature sensor 31 is mounted in conduit 13 connecting the adsorber beds to cooler 14 in the heating circuit. The gas composition analyzers 27, 28, and 29, and the temperature sensors 30 and 31 are connected to the control device 11 which in turn electrically or pneumatically controls each of the valves controlling flow through the various valved conduits in the system.

Assuming that adsorber 1 is in the sorption phase, gas composition analyzer 27 maintains a continuing check on the composition of gas flowing from adsorber 1. When adsorber 1 has become saturated with a key condensable hydrocarbon, such as propane, its presence in the effluent gas stream in conduit 7 when first determined by analyzer 27 will be signaled to the control device 11. Simultaneously, the temperature of the gas flowing from the bed in the cooling circuit and from the bed in the heating circuit is being measured by temperature sensors 30 and 31, respectively. These temperatures are also signaled to the control device 11. If these temperatures are not those desired, the control device will not make any changes in the gas flow pattern until the proper temperatures are obtained. The control device during the next cycle will then correct the discrepancy in cooling, heating and saturating periods by: (a) opening or closing valve V–19 to force more or less cooling gas to flow in the cooling gas circuit; (b) increasing or decreasing the rate of flow of gas circulating in the heating circuit by bypassing more or less of the heating gas through bypass valve V–20. At the end of the next cycle the control device will again compare the temperatures of gas streams flowing from the bed being cooled and the bed being heated and make similar adjustments to make these time intervals equal.

When an adsorber has been heated to the desired temperature and a new cycle is to begin, the next step is to cool the heated bed by placing it in the cooling circuit. In most instances it is desirable to displace the hot regeneration gas in the heated bed into the adsorber next to be heated. This gas is rich in condensables and, if allowed to escape from the system, represents a loss of desired product. The displacing gas can be a lean gas such as residue gas from the sorption circuit or it can be raw feed gas. The gas composition-analyzer located at the exit from the hot bed from which rich gas is displaced can be utilized to note the arrival of the lean gas displacement front at the exit from that bed. A signal of this fact from the gas composition-analyzer can be used to then switch the system to the next cycle.

Thus, in the preceding example, when the system is to be changed to a new cycle as indicated by the breakthrough of a key component in adsorber 1, adsorber 2 would be switched into the sorption circuit and a portion of the residue gas flowing through conduit 8 diverted through conduits 21, 22B, a portion of conduit 5B, into adsorber 3 so that the gas therein is displaced through conduits 7B, 6B, 13, cooler 14, conduit 15, separator 16, conduit 17, blower 18, conduit 19, heater 20, and into adsorber 1. Correspondingly, the gas in adsorber 1, a lean gas, is displaced into the residue gas line 8. The arrival of the lean gas displacement front at gas composition-analyzer 29, when detected and signaled to the control device opens and closes, through the agency of the control device, the appropriate valves to put adsorber 1 in the heating circuit and adsorber 3 in the cooling circuit.

Referring now to FIG. 2, control device 11 can be designed and constructed by anyone skilled in the instrumentation and computer arts. Necessary for its function are a memory device which can compare the temperatures detected by temperature sensors 30 and 31 from one cycle to the next. Control device 11 must also contain a switching mechanism to open and close the appropriate valves when appropriately signaled from the temperature sensors and the gas composition-analyzers. Thermocouples may be used as temperature sensors.

The heart of control device 11 is a valve programmer. This can be a drum device upon which all the valve positions (valves V-1 through V-20) are programmed for each cycle in the process. The drum is rotated from position to position by the other control devices. As the drum is rotated to a new position the program on the drum directs which valves should open or close in each cycle.

The gas compositional analyzers and thermocouples (TS 30 and 31) deliver an electrical signal in the millivolt range which is sufficient to actuate an electrical relay which can be used to advance the valve programmer to the next position. The set reference point on each of these sensors can be chosen by the designer of a particular processing plant or the plant operator. These reference points will correspond to the desired final operating conditions of each adsorber at the end of a cycle; i.e., the composition of the desired *maximum* amount of product *leaving* the adsorber in the adsorption circuit, the temperature of the gas leaving the cooling adsorber in the cooling circuit, and the temperature of the gas leaving the heating adsorber in the heating circuit.

Thus these are the three signals which would indicate to the valve program that it should advance to the next valve sequence.

The memory device is also required to facilitate control of valves V-19 and V-20. There are a number of ways in which this can be accomplished; one is presented here.

It is desirable before advancing from one cycle to the next that the regenerating bed be heated to a predetermined temperature and the cooling bed be cooled to a predetermined temperature. In order to obtain these desired temperatures the signal from the gas composition-analyzer downstream of the adsorber in the sorption circuit may have to be overridden.

The memory units combined within the controller 11 can be simply a clock mechanism for each of the gas composition-analyzers and each temperature sensor. The clock has two hands. One hand counts the number of minutes elapsed since the beginning of a cycle. The other hand is set on the time required for the previous cycle. At the end of the cycle the role of the hands is changed.

If a gas composition-analyzer indicates breakthrough of the key component, before both of the temperature sensors indicate that the desired cooling and heating temperatures have been reached in the cooling and heating circuits, the system is not changed until these desired temperatures are reached. Similarly, the system is not changed to the next cycle if the desired temperatures are reached before breakthrough of a key component. This is easily programmed into the valve drum by requiring all three signals to be received by the control device 11 before advancing to the next cycle.

The valves V-19 and V-20 are opened or closed by means of control device 11 so that the ratio of volumes of gas flow in the heating and cooling circuits during the present cycle to the volumes of flow in the respective circuit in the previous cycle is inversely proportional to the time in the previous cycle required for breakthrough of the key component in the adsorber in the sorption circuit to the time required to obtain complete cooling and heating of the respective beds in the cooling and heating circuits. Stated another way.

$$\frac{V_1}{V_2} = \frac{T_2}{T_1}$$

where $V_1$ = volume of gas flow during present cycle in the heating or cooling circuit $V_2$ = volume of gas flow during previous cycle in the heating or cooling circuit $T_1$ = time to achieve breakthrough of key component in the adsorber in the sorption circuit in the previous cycle $T_2$ = time to achieve the desired heating or cooling of the respective adsorber in the heating or cooling circuit during the previous cycle.

Thus, if an adsorber is cooled too slowly, valve V-19 will be partially closed to increase proportionately the amount of gas flowing through conduit 21. Correspondingly, if an adsorber is heated too slowly, valve V-20 will be partially closed to increase proportionately the volume of gas circulated through conduit 19.

A more elaborate memory system can be installed in control device 11 which allows comparison of several previous cycles.

Thus, utilizing this control system, a minimum sized adsorber can be used, the only requirement being that the gas blowers handle the maximum gas volume required.

EXAMPLE

Raw natural gas feed is processed by a system as shown in FIGS. 1 and 2. Adsorbers 1, 2, and 3 each spend between about 20 and 30 minutes on adsorption, 20 and 30 minutes of heating, and between 20 and 30 minutes being cooled. The system is switched from one cycle to the next responsive to measurement of one of the gas composition analyzers 27, 28, or 29. The corresponding desired gas temperature at sensor 31 is 300° F. and in the cooling circuit measured at temperature sensor 30 is 400° F. Control device 11 varies the flow of gas through valves V-19 and V-21 to attain these desired temperatures during the period of time required to saturate the "on stream" adsorber with propane. Feed gas in conduit 4 is at a temperature of 100° F. and 500 p.s.i.a. and over a period of months will vary in flow volume between 12 and 20MM cf./day. Adsorber vessels 1, 2, and 3, each have a volume of 600 ft.³ before bed fill is added and operate at a pressure of about 500 p.s.i.a. Each adsorber contains about 16,000 pounds of activated carbon (8 to 10 mesh). Adsorbent temperature is about 120° F. during adsorption, a maximum of 600° F. during regeneration, and is cooled to about 90° F. during the cooling phase. Residue gas in an amount of between 11.6 and 19.3MM cf./day, at about 110° F. and 500 p.s.i.a. is removed by way of conduit 8. Regeneration gas is circulated in conduit 9 in an amount of between 12 and 18MM cf./day at about 630° F. and 500 p.s.i.a. Gas in conduit 15 has a temperature of about 95° F. Separator 16 operates at 95° F. and 500 p.s.i.a. The mol percent composition of feed gas flowing in conduit 4 ranges from 89.80 to 87.66% methane, 7.50 to 6.13% ethane, 3.00 to 2.12% propane, 1.22 to 1.06% butane, 0.52 to 0.48% pentane, and 0.16 to 0.79% hexane and heavier. The composition of residue gas flowing in conduit 8 is 93.49 to 92.00% methane, 7.92 to 6.45% ethane, and 0.08 to 0.06% propane. The composition of gas flowing in conduit 13 is 15.2 to 10.8% ethane, 16.1 to 14.3% propane, 5.2 to 4.1% butane and 0.8 to 0.2% pentane. Raw liquid product is removed by way of conduit 18 in an amount of between 20,000 and 30,000 gal./day. Cool gas is flowed by way of conduit 19 to heater 20 at a rate of between 12 and 18MM cf./day at 110° F. and 500 p.s.i.a. Heater 20 is designed for a duty of 22 million B.t.u./hr.

Cooling gas is circulated through conduit 21 at a rate of 10 to 16.7MM cf./day and has an average temperature of 80° F. Cooling gas exits by way of conduit 25 in an amount of between about 10 to 16.7MM cf./day and it at about 590° F. and 500 p.s.i.a.

From the foregoing it will be apparent that a method of continually adjusting a gas processing system has been provided. The gas composition analyzers permit the detection of the point of saturation of an adsorber with a key component. The use of the control device permits the system to be changed from one cycle to the next and also adjusts the flow rate of cooling gas in the cooling circuit and the flow rate of gas in the heating circuit to adjust the time period for cooling and heating to the time required to saturate an adsorber with a key component.

Although the figures illustrate a system using three beds, it will be obvious to those skilled in the art that the principle is applicable to systems using more or less than three sorption beds, for instance using two sorption beds, or even in a one-bed system on intermittent service. The words "sorption," "sorbent," etc., used herein are to connote the phenomena of adsorption and/or absorption. Although the system has been described for removing gasoline and/or water from natural gas, it applies broadly to removal of condensable vapor from any gas.

Having thus described the invention by providing specific examples thereof, it is to be understood that no undue limitations or restrictions are to be drawn by reason thereof and that many variations and modifications are withing the scope of the invention.

What is claimed is:

1. In a cyclic process for extracting condensables from a gas stream wherein:
    (a) a stream of raw unprocessed gas is flowed through a first sorbent body, thereby adsorbing condensables from said stream of unprocessed gas onto said sorbent body;
    (b) an effluent stream of stripped residue gas is flowed from said first sorbent body;
    (c) simultaneously a second sorbent body containing adsorbed condensables from a previous cycle is heated by flowing a stream of heated gas through said second sorbent body thereby vaporizing said adsorbed condensables into said flowing stream of heated gas; and
    (d) an effluent stream of heated gas containing vaporized condensables is flowed from said second sorbent body of (c);
the improvement comprising:
    (e) providing a gas-composition analyzer communicating with said effluent stream of residue gas of (b);
    (f) providing a temperature-sensing means communicating with said effluent heated gas stream of (d);
    (g) coupling a control device with said gas composition analyzer of (e), said temperature-sensing means of (f), and valves controlling the flow of gas through said first sorbent body of (a) and said second sorbent body of (c);
    (h) detecting the initial presence of a key component in the effluent residue gas stream of (b) by means of said gas composition analyzer of (e);
    (i) measuring in said control device of (g) the temperature of said effluent heated gas stream of (d) by means of said temperature-sensing means of (f);
    (j) comparing said temperature of (i) wtih a predetermined temperature;
    (k) diverting the flow stream of heated gas of (c) through said first sorbent body of (a) when said initial presence of a key component (h) is detected and when said temperature of (i) reaches said predetermined temperature of (j);
    (l) adjusting the rate of flow of said heated flow stream of (c) through said first sorbent body of (a) to attain said predetermined temperature of (j) at a point in time substantially the same as that when the initial presence of the key component of (h) is detected in the effluent residue gas stream flowing from a third sorbent body beinng exposed to said stream of unprocessed gas of (a).

2. The process of claim 1 wherein following step (j) and prior to step (k) the gas present in said second sorbent body is displaced into a third sorbent body next to be heated as in step (c).

3. The process of claim 1 wherein said raw gas stream is primarily a mixture of hydrocarbons and said key component is propane.

4. In a cyclic process for extracting condensables from a gas stream wherein:
    (a) a stream of raw unprocessed gas is flowed through a first sorbent body, thereby adsorbing condensables from said stream of unprocessed gas to said sorbent body;
    (b) an effluent stream of stripped residue gas is flowed from said first sorbent body;
    (c) simultaneously a second sorbent body containing adsorbed condensables from a previous cycle is heated by flowing a stream of heated gas through said second sorbent body thereby vaporizing said adsorbent condensables into said flowing stream of heated gas;
    (d) an effluent stream of heated gas containing vaporized condensables is flowed from said second sorbent body of (c);
    (e) simultaneously a third sorbent body heated from a previous cycle is cooled by flowing a stream of cooling gas through said third sorbent body; and
    (f) an effluent stream of heated cooling gas is flowed from said third sorbent body;
the improvement comprising:
    (g) detecting the initial presence of a key component in the effluent residue gas stream of (b);
    (h) measuring the temperatures of said effluent heated gas stream of (d), and said effluent stream of heated cooling gas of (f) when said initial presence of a key component of (g) is first detected;
    (i) comparing the measured temperatures of (h) with predetermined temperatures and when said measured temperatures are equal to said predetermined temperatures;
    (j) diverting the flowstream of heated gas of (c) through said first sorbent body of (a);
    (k) diverting the flowstream of cooling gas of (e) through said second sorbent body of (c);
    (l) diverting the flowstream of raw unprocessed gas of (a) through said third sorbent body of (e); and
    (m) adjusting the rates of flow of said heated gas of (j) and said cooling gas of (k) to attain said predetermined temperatures of (i) in the effluent streams from said sorbent bodies of said second and third sorbent bodies at a point in time substantially the same as that when the initial presence of the key component of (g) is first detected in the effluent gas stream flowing from said third sorbent body.

5. The process of claim 4 wherein following step (i) and prior to step (j) the gas present in said second sorbent body is displaced into said first sorbent body.

6. A system for extracting condensables from a gas stream comprising:
    (a) a sorption circuit including a first bed of sorbent material and a gas conduit leading from said bed of sorbent material;
    (b) a heating circuit connected to said sorption circuit, including a second bed of sorbent material and a second conduit leading from said second bed of sorbent material;
    (c) a cooling circuit connected to said sorption circuit and said heating circuit, including a third bed of sorbent material and a third conduit body from said third bed of sorbent material;
    (d) first, second, and third gas composititon analyzers communicating with said first, second and third conduits, respectively;
    (e) first and second temperature sensors communicating with said second and third conduits, respectively;
    (f) valve means for controlling flow in said sorption, heating, and cooling circuits;
    (g) control means comprising: (1) means for opening and closing said valve means responsive to signals from said first, second and third gas composition analyzers, (2) means for comparing the temperatures detected by said first and second temperature sensors with predetermined temperatures, and (3) means for controlling the flow of gas through said heating and cooling circuits in response to the temperature comparisons of (2); and (h) means connecting said control means (g) to said first, second, and third gas compositiion analyzers, said valve means (f) and said means for controlling (3).

References Cited

UNITED STATES PATENTS

| 2,661,812 | 12/1953 | Gilmore | 55—20 |
| 3,186,144 | 6/1965 | Dow | 55—20 |
| 3,359,706 | 12/1967 | Zankey | 55—20 |
| 3,405,507 | 10/1968 | Spencer et al. | 55—62 |
| 3,446,709 | 5/1969 | Marshall | 55—160 X |

JOHN W. ADEE, Primary Examiner

U.S. Cl. X.R.

55—62, 163, 180